United States Patent [19]
McHugh

[11] Patent Number: 4,668,108
[45] Date of Patent: May 26, 1987

[54] BEARING HAVING ANISOTROPIC STIFFNESS

[75] Inventor: James D. McHugh, Schenectady, N.Y.

[73] Assignee: General Electric Company, Schenectady, N.Y.

[21] Appl. No.: 714,867

[22] Filed: Mar. 22, 1985

[51] Int. Cl.⁴ ............... F16C 27/02; F16C 27/04; F16C 27/06
[52] U.S. Cl. ............................. 384/215; 384/310; 384/428
[58] Field of Search ............... 384/103, 114, 115, 117, 384/119, 192, 195, 199, 215, 218, 428, 302, 309, 312, 311, 310

[56] References Cited

U.S. PATENT DOCUMENTS

| | | | |
|---|---|---|---|
| 331,311 | 12/1885 | Marquardt | 382/218 |
| 1,664,880 | 4/1928 | Flintermann | 384/218 X |
| 1,919,489 | 7/1933 | Treschow | 384/310 |
| 2,363,260 | 11/1944 | Peskin | 384/311 |
| 3,015,523 | 1/1962 | Semar | 384/114 |

FOREIGN PATENT DOCUMENTS 1072836 9/1954 France .............................. 384/215

OTHER PUBLICATIONS

J. C. Nicholas et al., "The Influence of Tilting Pad Bearing Characteristics . . . " ASME Spec. Publ. *Topics in Fluid-Film Bearing System Design and Optimization,* 1978, pp. 55–78.

W. Kellenberger, "The Stability of High-Speed Shafts Supported by Anisotropic Bearings . . . " The Brown Boveri Review, No. 11/12, Nov./Dec. 1963, pp. 756–766.

*Primary Examiner*—Stuart S. Levy
*Assistant Examiner*—Lynn M. Sohacki
*Attorney, Agent, or Firm*—Jerome C. Squillaro

[57] ABSTRACT

An anisotropic bearing support for a high-speed rotor includes at least two support devices having different values of stiffness. The two support devices act at substantially the same point on the perimeter of the rotor along radial directions which are angularly spaced apart from each other. The resulting anisotropic bearing support reduces the incidence and severity of rotor vibration and improves rotor stability.

9 Claims, 5 Drawing Figures

BEARING HAVING ANISOTROPIC STIFFNESS

BACKGROUND OF THE INVENTION

The present invention relates to rotating machinery and, more particularly, to bearings for high-speed rotors in rotating machinery.

High-speed rotors are used in, for example, steam turbines, gas turbines and compressors where they are subjected to forces which may produce vibrations capable of leading to failure of the machine. One such force excitation source is rotor imbalance. Rotor imbalance produces synchronous vibrations at the rotational frequency of the rotor. These vibrations are amplified when the rotor speed passes through specific narrow ranges of speed called critical speeds or system resonances. The rotor vibrational amplitudes which occur during transition through these critical speed zones may be limited by improved rotor balance, additional system damping and by reducing the time that the rotor spends in the critical zones as it accelerates or decelerates therethrough. A well-balanced rotor which does not have a critical speed corresponding to its operating speed may therefore reach and operate at speeds substantially higher than the critical speeds without exhibiting excessive synchronous vibrations.

In contrast to synchronous vibrations, sub-synchronous vibrations are not produced by rotor imbalance and their occurrence is not limited to narrow speed zones. Thus, sub-synchronous vibrations are not generally curable by improved rotor balance nor by rapid acceleration or deceleration through specific speeds. A machine subject to sub-synchronous vibrations typically exhibits a pattern in which the vibration develops suddenly when the rotor speed exceeds a threshold value. The frequency of the vibration is usually a fraction of the rotor speed and often coincides with a system resonant frequency which has been traversed as the rotor speed is increased to the threshold value. The amplitude of the sub-synchronous vibration component of total vibration often exceeds the synchronous component of vibration due to rotor imbalance. Further increases in rotor speed above the threshold value generally do not change the sub-synchronous vibration frequency but such increases do increase the amplitude thereof. Thus, the rotor threshold speed at which sub-synchronous vibrations begin may be a limiting speed for the rotor and may force operation at lower than optimum design speeds.

Sub-synchronous rotor vibrations are produced by phenomena of a different nature than rotor imbalance. The phenomena share a common characteristic: displacement of the rotor in a given radial direction produces two distinct forces; one of these is a restoring force acting in the direction of rotor displacement and the other is normal to it. The latter force is known as a cross-coupling force.

Practical experience and theoretical considerations have identified the major phenomena producing such cross-coupling forces which excite sub-synchronous vibrations. These phenomena include sliding friction in rotor shrink fits and couplings, stress-strain hysteresis in rotor materials, hydrodynamic bearing behavior and aerodynamic phenomena produced by labyrinth seals and non-uniform blade tip clearances in turbines and compressors. Several such cross-coupling forces may exist on a given rotor.

While the sources of cross-coupling forces are known to experienced rotor designers, it may be impossible to avoid all of them by practicable design modifications or to estimate their magnitude at the design stage. Some steps which have successfully been employed to reduce cross-coupling forces include eliminating shrink fits wherever possible, reducing the opportunity for shrink fits, which cannot be eliminated, to open and permit frictional sliding, minimizing circumferential variations in blade tip clearances, and using fluid-film bearing designs which minimize cross-coupling forces from this source. Tilting-pad journal bearings are widely used as an alternative to cylindrical bore bearings because of their ability to minimize bearing-induced cross-coupling forces.

Despite employment of these well-known design steps, destructive sub-synchronous rotor vibrations continue to exist as a serious problem on many high-speed rotating machines. Further design approaches to counteract the destabilizing effects of cross-coupling forces are clearly desirable. Often, the problem of sub-synchronous vibrational instability on a given new machine is not suspected until the first tests reveal it. The appearance of an unsuspected sub-synchronous vibration condition makes it particularly desirable to have a simple solution which can be applied without extensive rotor or stator modifications to counteract the destabilizing forces.

In 1963, a paper: W. Kellenberger, 50 The Brown Boveri Rev. No. 11/12, Nov/Dec 1963, pp. 756-766; suggested that the effects of cross-coupling forces may be minimized by supporting a rotor in a manner which employs different stiffnesses in the horizontal and vertical directions.

Other writers have suggested the possibility of using anisotropy in a support bearing, but none have advanced any particular structure which accomplishes this end, e.g. J. C. Nicholas, et al, ASME Spec. Publ. *Topics in Fluid-Film Bearing System Design and Optimization,* 1978, pp. 55-78, "The Influence of Tilting Pad Bearing Characteristics on the Stability of High Speed Rotor-Bearing Systems".

Although the advantages of anisotropic bearing support appears to be established by the referenced papers, the literature is innocent of any suggestion of an embodiment of a bearing system for using anisotropic bearing support in high-speed machinery.

OBJECTS AND SUMMARY OF THE INVENTION

Accordingly, it is an object of the invention to provide an improved bearing for supporting a high-speed rotor.

It is a further object of the invention to provide a bearing for supporting a high-speed rotor which damps sub-synchronous vibrations in the rotor.

It is a still further object of the invention to provide a bearing having anisotropic stiffness for supporting a high speed rotor with at least two different stiffnesses in at least two different directions.

Briefly stated, the present invention provides an anisotropic bearing support for a high-speed rotor including at least two support devices having different values of stiffness. The two support devices act at substantially the same point on the perimeter of the rotor along radial directions which are angularly spaced apart from each other. The resulting anisotropic bearing support reduces the incidence and severity of rotor vibration.

According to an embodiment of the invention, there is provided apparatus for rotatably supporting a shaft of a rotating machine comprising at least one bearing member at least partially surrounding a surface of the shaft, means for mounting the at least one bearing member in the rotating machine, the means for mounting including at least first and second resilient support devices, the first and second resilient support devices including first and second support axes respectively, the first and second support axes being angularly displaced from each other and the first and second support devices including different stiffnesses whereby a support anisotropy is achieved.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
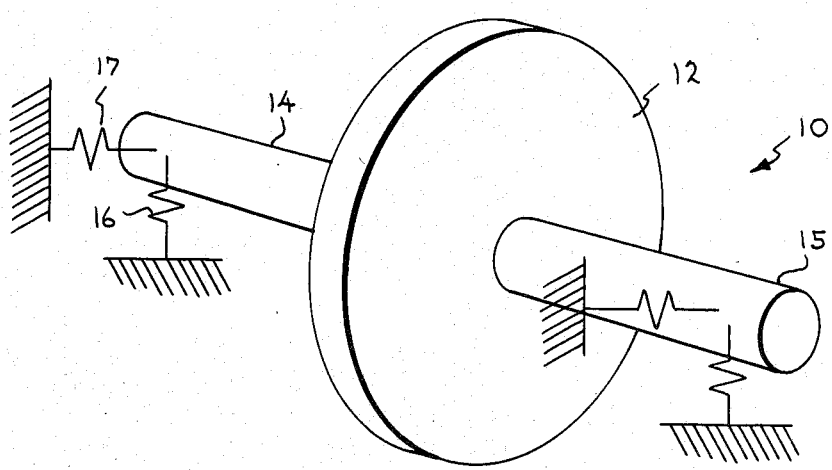
FIG. 1 is a simplified schematic diagram of a rotor and its bearing system to which reference will be made in describing the problem to be solved and the manner in which the present invention addresses the problem.

Referring to FIG. 1, a rotor, shown generally at 10, includes a rotor disk 12, supported between shafts 14 and 15. The bearings supporting shafts 14 and 15 are represented by pairs of springs 16 and 17. Springs 16 are generally vertically disposed and springs 17 are generally horizontally disposed. If springs 16 and 17 are conventional fluid-film bearings, the stiffness, or spring constants thereof, are fixed by the bearing design and any stiffness anisotropy which may exist therein is incapable of manipulation to tailor the stiffnesses to a particular machine. According to an embodiment of the invention described hereinbelow the stiffnesses of springs 16 and 17 can be modified as desired to optimize vibration damping therein.

Figure 2:
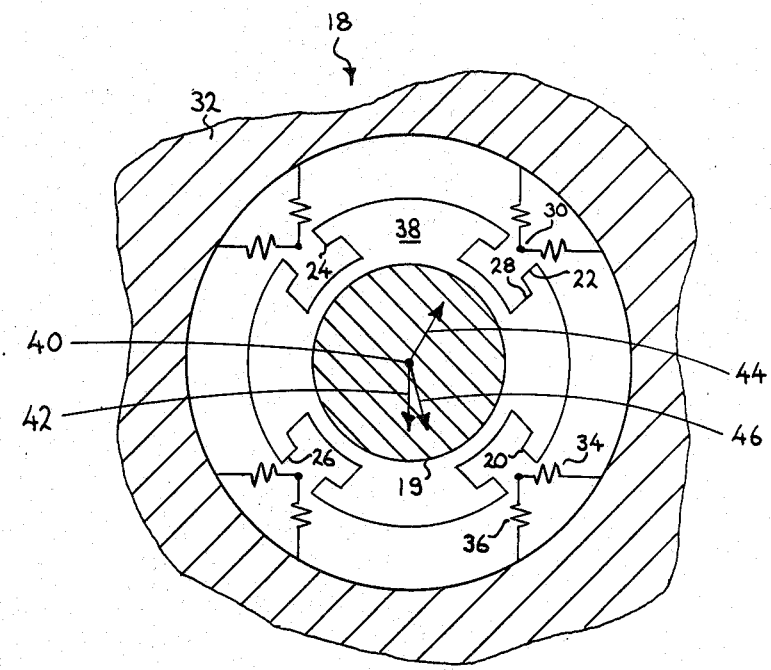
FIG. 2 is a transverse cross-section of an anisotropic bearing assembly according to an embodiment of the invention.

Referring now to FIG. 2, a high-speed machine 18, only a portion of which is shown, includes a shaft 19 rotatably supported on a plurality of tilting pad bearings 20, 22, 24 and 26. Bearings 20, 22, 24 and 26 are substantially identical, thus only bearing 20 is described in detail.

Figure 3:
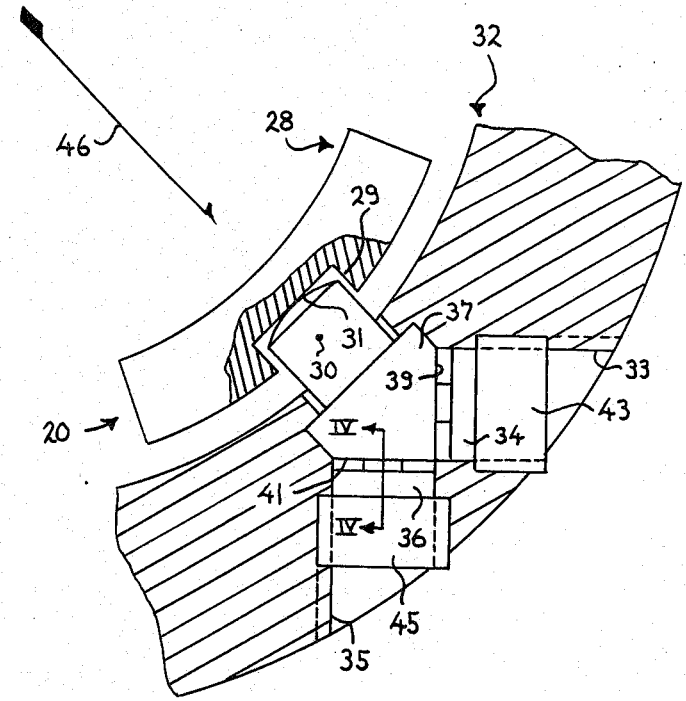
FIG. 3 is an enlarged view of an anisotropic bearing of FIG. 2.

Referring now also to FIG. 3, bearing 20 includes a bearing pad 28 having a blind bore 29 therein. A bearing pivot 30 includes a domed outer end 31 bearing against an inner end of blind bore 29. A bearing housing 32 includes first and second threaded bores 33 and 35 having axes disposed at right angles to each other; that is, the axis of threaded bore 35 is substantially vertical and the axis of threaded bore 33 is substantially horizontal. A block 37 at the base of bearing pivot 30 includes a vertical plane surface 39 facing threaded bore 33 and a horizontal plane surface 41 facing threaded bore 35. A pivot support 34 is disposed in threaded bore 33 in abutment with vertical plane surface 39. A threaded support plug 43 is threaded into threaded bore 33 to urge pivot support 34 into contact with vertical plane surface 39. Similarly, a pivot support 36 in threaded bore 35 is maintained in contact with horizontal plane surface 41 by a threaded support plug 45 threaded into threaded bore 35. A film 38 of a pressurized lubricating fluid such as, for example, oil, between tilting shoe bearing pad 28 and shaft 19 maintains the facing surfaces out of contact with each other and carries through forces from shaft 19 through bearing housing 32 to the remainder of high-speed machine 18.

Figure 4:
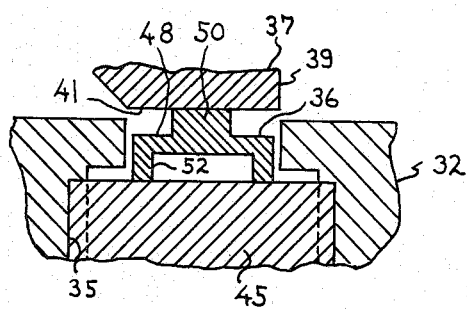
FIG. 4 is a cross section taken along IV—IV of FIG. 3.

Referring now to FIG. 4, pivot support 36 includes a web 48 having a central boss 50 thereon bearing against horizontal plane surface 41. An annular flange 52 about the perimeter of web 48 bears against threaded support plug 45. The stiffness with which forces are carried through pivot support 36 between bearing housing 32 and block 37, and thence to tilting shoe bearing pad 28, (FIG. 3) depends on the material and dimensions of pivot support 36. In particular, the spring constant of pivot support 36 can easily be varied by varying the thickness of web 48.

Referring again specifically to FIG. 3, it will be recognized that pivot support 34 provides support to block 37 principally in the horizontal direction and pivot support 36 provides support principally in the vertical direction. Anisotropic support stiffness can therefore be achieved by using different web thicknesses in pivot supports 34 and 36. In addition, a stiffness combination can be tailored to a particular application by changing pivot supports 34 and 36 without the need for redesigning high-speed machine 18.

Referring again to FIG. 2, shaft 19 rotates about an axis having a normal home position 40. A gravity vector 42 and a load vector 44 combine to form a total load vector 46 along which the axis of shaft 19 is displaced from its normal home position 40.

The forces acting in the two orthogonal directions on shaft 19 are known, can be calculated, or can be determined from test data. Test data, for example, provides the displacement in a given direction in response to an applied force. From this, it is possible to calculate a component of total load vector 46 for each bearing 20, 22, 24 and 26. This permits calculating values of stiffness necessary for supporting each bearing 20, 22, 24 and 26.

For purposes of the following example, it is assumed that there are two differing supports used with each bearing, and that the stiffnesses provided thereby act along orthogonal axes. This simplifies the calculations of the appropriate relative stiffnesses of each pivot support but is not a necessary limitation on the invention. It is possible, of course, to utilize more than two different supports, and to orient the axes of the supports in directions other than orthogonal to one another, or other than in the vertical and horizontal directions. This, however, complicates the calculations involved since the forces imparted thereby must be resolved and then geometrically summed. For this reason, the illustrated embodiment, in which there are only two supports, first pivot support 34 and second pivot support 36, orthogonal to one another, is preferred. It is also possible to orient the two stiffnesses in directions which are equally disposed about an imaginary line coincident with total load vector 46, to simplify the calculations involved, but this is less preferred than the illustrated embodiment.

The calculation of the total stiffness imparted to shaft 19 is based upon known formulae for summing spring constants (spring constants being the inverse of stiffness). The total stiffness is that provided by bearings 20, 22, 24 and 26 as modified by the stiffness of film 38.

The summation of the two stiffnesses is equivalent to summing the inverses of two spring constants. The following example shows the calculation of the relationship of the bearing anisotropy with the stiffnesses of each of pivot supports 34 and 36.

The spring constant K of film 38 is indicated by the suffix f, with an additional suffix indicating whether it is the component thereof in the x (horizontal) or y (vertical) direction. Similarly, the pivot stiffness imparted by pivot support 34 is indicated by the suffix px, for the pivot support exerted in the x direction, and the stiffness imparted by pivot support 36 is indicated by the suffix py.

$$1/Kcx = 1/Kfx + 1/Kpx \qquad \text{eq. (1)}$$

and $$1/Kcy = 1Kfy + 1/Kpy \qquad \text{eq. (2)}$$

from which $$Kcx = (Kfx \cdot Kpx)/(Kfx + Kpx) \qquad \text{eq. (3)}$$

and $$Kcy = (Kfy \cdot Kpy)/(Kfy + Kpy) \qquad \text{eq. (4)}$$

and $$Kcx - Kcy = (Kfx \cdot Kpx)/(Kfx + Kpx) - (Kfy \cdot Kpy)/(Kfy + Kpy) \qquad \text{eq. (5)}$$

Using eq. (5), it is possible to solve for one pivot stiffness, so long as the other is known or assumed, and the desired difference between the two pivot stiffnesses (i.e. the anisotropy thereof) is given (the stiffness of film 38 being known). The calculation of the desired anisotropy is based upon the design parameters of high-speed machine 18 and the total load on shaft 19.

If it is assumed that the fluid film stiffnesses in both coordinate directions and the stiffness of pivot support 34 are all $5 \times 10$ exp 6 lbs/in, and a stiffness anisotropy of one-tenth that amount is desired, e.g (5) can be solved to show that the stiffness necessary for pivot support 36 is approximately $3.33 \times 10$ exp 6. These stiffnesses are implemented by establishing the thicknesses of webs 48 (FIGS. 3 and 4) in pivot supports 34 and 36. The resulting high-speed machine 18 has improved capability for avoiding sub-synchronous vibrations or of increasing the rotor speed at which they begin.

Figure 5:
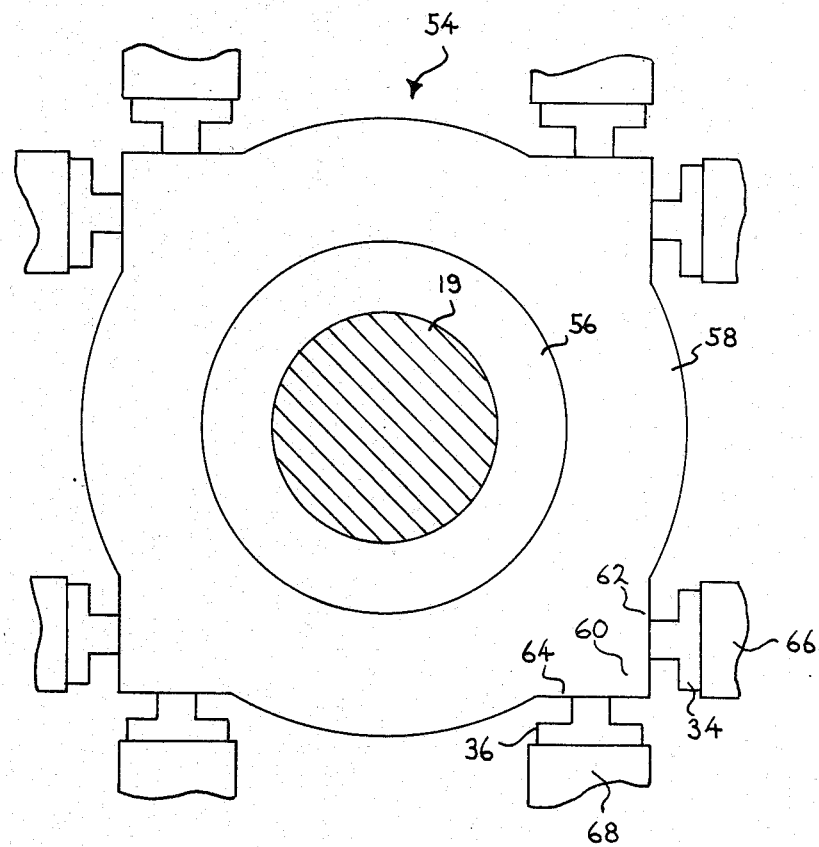
FIG. 5 is a transverse cross section of an anisotropic bearing assembly which employs a journal bearing or a ball or roller bearing assembly.

Although the preceding description of the invention has been in the environment of a tilting pad bearing, the invention is not limited to such an environment. The invention is equally applicable to other types of bearings, such as, for example, elliptical or circular journal bearings, damper bearings, and roller or ball bearings. Referring to FIG. 5, for example, a bearing system 54 includes a shaft 19 surrounded by a bearing 56. A bearing housing 58 surrounding bearing 56 includes four right-angled bosses 60. Each right-angled boss 60 includes a vertical surface 62 and a horizontal surface 64 against which abut pivot support 34 and pivot support 36 respectively. Pivot supports 34 and 36 are retained in position by support devices 66 and 68 respectively which are rigidly mounted to the remainder of the rotating machine by any convenient means (not shown). Bearing 56 may be, for example, a journal bearing which is supplied with a pressurized lubricant between its inner surface and the outer surface of the shaft 19. Alternatively, bearing 56 may be a ball or roller bearing assembly and bearing housing 58 may be a damper bearing in which a pressurized fluid is introduced between its inner surface and the outer surface of bearing 56. As in the tilting-shoe embodiment of FIGS. 2-4, the desired support anisotropy is achieved by varying the thickness of web 48 (FIG. 4).

It would be clear to one skilled in the art that those of pivot supports 36 which act vertically upward are required to support the weight of the rotor as well as the rotor dynamic load whereas those which act vertically downward are required to support only the dynamic load. It, thus, may be desirable to use different stiffnesses in those pivot supports 36 acting vertically upward from those pivot supports 36 acting vertically downward so that the net contribution of the combination provides the desired anisotropy. The existence of a side load may make it desirable to employ pivot supports 34 acting in one horizontal direction which have a stiffness different from those acting in the opposite horizontal direction. The total stiffness in the vertical direction is, of course, the resultant of the stiffnesses of upward-acting and downward-acting bearing supports 36. The same is true of horizontal-acting bearing supports 34.

Other types of devices may be substituted for pivot supports 34 and 36 without departing from the spirit and scope of the invention. For example, a polymeric material may be sandwiched between opposing faces with the differences in stiffness being accomplished by different thicknesses, diameters or compositions of material. Another type of resilient device contemplated to fall within the scope of the invention includes one or more domed washers such as, for example, Belgian washers. Differences in resilience can be achieved by stacking more domed washers in an assembly requiring greater stiffness. Domed washers may, of course, be stacked in nested or opposed relationship, or combinations thereof, to achieve a linear or shaped response.

As previously noted, calculations and description are simplified by anisotropic support devices having orthogonal axes, and particularly when the axial directions of the support devices are limited to horizontal and vertical directions. The preceding description using four support points spaced 90 degrees apart about the circumference of shaft 19 embodies this simplification. The use of four equally spaced support locations with vertical and horizontal axes are conveniences only and do not represent a limitation on the present invention. For example, an embodiment of the invention could include three support points spaced 120 degrees apart. The axes of the supports may be orthogonal to each other or may be directed in other than orthogonal directions. The invention should also be considered to include more than four support points and more or less than two support devices at each support point. One skilled in the art, with the present disclosure before him, would be fully enabled to carry out the routine engineering calculations to create the desired anisotropy for such alternative embodiments; the description thereof being therefore omitted herein.

Any suitable material may be used for fabricating pivot supports 34 and 36. In the preferred embodiment, pivot supports 34 and 36 are steel.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for supporting a rotating shaft in a machine wherein the support apparatus comprises:

At least one tilting shoe bearing pad partially surrounding a surface of said shaft, means in said tilting shoe bearing pad for tiltably engaging a bearing pivot, a block on a radially outer end of said bearing pivot having first and second engagement surfaces disposed in different directions, a means for mounting the bearing pad in said machine including at least first and second resilient support devices, said first resilient support abutting said first engagement surface, said second resilient support abutting said second engagement surface, said first and second support devices including first and second support axes which are angularly displaced from each other: and, a stiffness of said first resilient support being different from a stiffness of said second support whereby support anisotropy is achieved.

2. Apparatus according to claim 1 wherein said bearing pivot includes a domed outer end and said means in said tilting shoe bearing pad for tiltably engaging includes a blind bore fittable over an end of said bearing pivot whereby said domed outer end abuts an inner end of said blind bore.

3. Apparatus according to claim 1 wherein said means for mounting further includes a bearing housing surrounding said tilting shoe bearing pad, said bearing housing including first and second threaded bores and first and second threaded support plugs threaded into said first and second threaded bores respectively, said first and second threaded support plugs engaging outer surfaces of said first and second resilient supports.

4. Apparatus according to claim 1 wherein said first and second resilient supports each include a web having a central boss centrally disposed therein, said central boss contacting its respective surface, and means for supporting a perimeter of said web whereby said web is effective as a spring for supporting said first and second engagement surfaces along an axis of said web.

5. Apparatus according to claim 4 wherein said webs in said first and second resilient supports have different thicknesses.

6. Apparatus according to claim 4 wherein said means for supporting a perimeter of said web includes an annular flange on a perimeter of said web, and means for contacting said annular flange.

7. An apparatus for supporting a rotating shaft of a machine wherein said support apparatus comprises:

a bearing member fully encircling said shaft, an annular member surrounding said bearing member including a plurality of right-angled bosses, each of said plurality of right-angled bosses including first and second surfaces facing in first and second different direction, a means for mounting the bearing member in the machine including at least a first and second resilient support devices which abut said first and second support surfaces respectively, said first and second support devices include first and second support axes respectively which are angularly displaced from one another, said at least first and second resilient support devices having different stiffnesses whereby a support anisotropy is achieved.

8. Apparatus according to claim 7 wherein said bearing member includes a journal bearing and said annular member is a bearing housing having said plurality of right-angled bosses on a radially outer surface thereof.

9. Apparatus according to claim 7 wherein said bearing member includes one of a ball bearing assembly and a roller bearing assembly and said annular member includes a damper bearing having said plurality of right-angled bosses disposed on a radially outer surface thereof.

* * * * *